US011435914B2

(12) United States Patent
Bazarsky et al.

(10) Patent No.: US 11,435,914 B2
(45) Date of Patent: Sep. 6, 2022

(54) DYNAMIC ZNS OPEN ZONE ACTIVE LIMIT

(71) Applicant: Western Digital Technologies, Inc., San Jose, CA (US)

(72) Inventors: Alexander Bazarsky, Holon (IL); Tomer Eliash, Kfar Saba (IL); Judah Gamliel Hahn, Ofra (IL); Ariel Navon, Revava (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 123 days.

(21) Appl. No.: 16/835,191

(22) Filed: Mar. 30, 2020

(65) Prior Publication Data

US 2021/0303188 A1   Sep. 30, 2021

(51) Int. Cl.
*G06F 11/07* (2006.01)
*G06F 3/06* (2006.01)

(52) U.S. Cl.
CPC .......... *G06F 3/0632* (2013.01); *G06F 3/0604* (2013.01); *G06F 3/0653* (2013.01); *G06F 3/0673* (2013.01); *G06F 11/0727* (2013.01); *G06F 11/0751* (2013.01); *G06F 11/0793* (2013.01)

(58) Field of Classification Search
CPC .... G06F 3/0632; G06F 3/0653; G06F 3/0673; G06F 3/0604; G06F 11/0793; G06F 11/0751; G06F 11/0727; G06F 3/0608; G06F 3/0616; G06F 3/064; G06F 3/0644; G06F 3/0679; G06F 11/0754; G06F 3/061
USPC ....................................................... 714/819
See application file for complete search history.

(56) References Cited

U.S. PATENT DOCUMENTS

| 8,245,101 | B2 * | 8/2012 | Olbrich | G06F 13/28 |
| | | | | 714/6.24 |
| 10,188,943 | B1 * | 1/2019 | Schwartz | H04H 60/00 |
| 10,417,190 | B1 * | 9/2019 | Donlan | G06F 16/128 |
| 11,222,330 | B2 * | 1/2022 | Dua | H04W 12/06 |
| 2004/0225952 | A1 * | 11/2004 | Brown | G06F 8/20 |
| | | | | 714/819 |

(Continued)

FOREIGN PATENT DOCUMENTS

| CN | 101183322 A | * | 5/2008 | ......... G06F 16/2358 |
| WO | WO-2021077260 A1 | * | 4/2021 | |

OTHER PUBLICATIONS

International Search Report and Written Opinion issued in corresponding International Patent Application No. PCT/US2020/035551, dated Aug. 2, 2020 (7 pages).

*Primary Examiner* — Albert Decady
*Assistant Examiner* — Enam Ahmed
(74) *Attorney, Agent, or Firm* — Patterson + Sheridan, LLP; Steven H. VerSteeg (57) ABSTRACT

A storage device includes a controller that can dynamically adjust the zone active limit (ZAL) for a zoned namespace (ZNS). Rather than assuming a worst-case scenario for the ZNS, the ZAL can be dynamically adjusted, even after providing the ZAL to a host device. In so doing, device behavior changes due to factors such as temperature, failed or flipped bit count, and device cycling can be considered as impacting the ZAL. The ZAL can then be adjusted over time, and the new ZAL can be communicated to the host device. As such, rather than a fixed, worst-case ZAL, the host device will receive updated ZAL values over time as the device performs.

20 Claims, 6 Drawing Sheets

(56) References Cited

U.S. PATENT DOCUMENTS

| | | | |
|---|---|---|---|
| 2011/0126085 A1* | 5/2011 | Teglia | G06F 21/64 |
| | | | 714/E11.024 |
| 2014/0040681 A1 | 2/2014 | Wolfman et al. | |
| 2016/0163392 A1 | 6/2016 | Zhao et al. | |
| 2019/0198114 A1 | 6/2019 | Ben-Rubi | |
| 2020/0089407 A1* | 3/2020 | Baca | G06F 3/0635 |
| 2020/0167274 A1* | 5/2020 | Bahirat | G06F 3/064 |
| 2020/0409601 A1* | 12/2020 | Helmick | G06F 3/061 |
| 2021/0182190 A1* | 6/2021 | Gao | G06F 12/0269 |
| 2021/0191638 A1* | 6/2021 | Miladinovic | G11C 29/52 |
| 2021/0223994 A1* | 7/2021 | Kanno | G06F 3/0604 |
| 2021/0255949 A1* | 8/2021 | Guda | G06F 12/0815 |

* cited by examiner

DYNAMIC ZNS OPEN ZONE ACTIVE LIMIT

BACKGROUND

Field of the Disclosure

Embodiments of the present disclosure generally relate to dynamically adjusting the zone active limit (ZAL) for a zoned namespace (ZNS) in a storage system.

Description of the Related Art

Zoned namespaces (ZNS) are a new direction in storage in which the data storage device restricts writes to sequential zones. ZNS is intended to reduce device side write amplification and overprovisioning by aligning host write patterns with internal device geometry and reducing the need for device side writes that are not directly linked to a host write.

ZNS offers many benefits including: reduced cost due to minimal DRAM requirements per SSD (Solid State Drive); potential savings due to decreased need for overprovisioning of NAND media; better SSD lifetime by reducing write amplification; dramatically reduced latency; significantly improved throughput; and a standardized interface that enables a strong software and hardware exo-system.

In a ZNS environment, the data storage device controller provides a zone active limit (ZAL) to the host device at the time of a zone open transition. ZAL represents the time that the open zone may remain open. ZAL is fixed throughout the time the block is in use by the host device, and the host device should finish the operations and close the zone before the ZAL has elapsed.

The ZAL is set based upon worst-case scenario assumptions, which leads to consideration of the worst-case conditions that a data storage device may face during the device lifetime. Worst-case scenarios lead to a degraded ZAL value being supplied to the host device and thus, lowered utilization of the memory.

Therefore, there is a need in the art for a ZNS device with a more robust ZAL value.

SUMMARY

The present disclosure generally relates to dynamically adjusting the zone active limit (ZAL) for a zoned namespace (ZNS). Rather than assuming a worst-case scenario for the ZNS, the ZAL can be dynamically adjusted, even after providing the ZAL to the host device. In so doing, device behavior changes due to factors such as temperature, failed or flipped bit count, and device cycling can be considered as impacting the ZAL. The ZAL can then be adjusted over time, and the new ZAL can be communicated to the host device. As such, rather than a fixed, worst-case ZAL, the host device will receive updated ZAL values over time as the device performs.

In one embodiment, a data storage device comprises: a memory device; and a controller supporting at least one zoned namespace (ZNS) coupled to the memory device, wherein the controller is configured to: receive a request from a host device to open a new zone; deliver an initial zone active limit (ZAL) value for the ZNS to the host device; change the initial ZAL value for the ZNS to a new ZAL value for the ZNS; and communicate the new ZAL value for the ZNS to the host device.

In another embodiment, a data storage device comprises: a memory device; and a controller coupled to the memory device, wherein the controller is configured to: provide an initial zone active limit (ZAL) value for a zone namespace (ZNS) to a host device; analyze a block of the ZNS; determine conditions in which the block operates; calculate a new ZAL value for the ZNS; and communicate the new ZAL value for the ZNS to the host device.

In another embodiment, a data storage device comprises: a memory device; a controller coupled to the memory device; and means to dynamically change an initial zone active limit (ZAL) value to a new ZAL value while a zoned namespace (ZNS) is open.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to dynamically adjusting the zone active limit (ZAL) for a zoned namespace (ZNS). Rather than assuming a worst-case scenario for the ZNS, the ZAL can be dynamically adjusted, even after providing the ZAL to the host device. In so doing, device behavior changes due to factors such as temperature, failed or flipped bit count, and device cycling can be considered as impacting the ZAL. The ZAL can then be adjusted over time, and the new ZAL can be communicated to the host device. As such, rather than a fixed, worst-case ZAL, the host device will receive updated ZAL values over time as the device performs.

Figure 1:
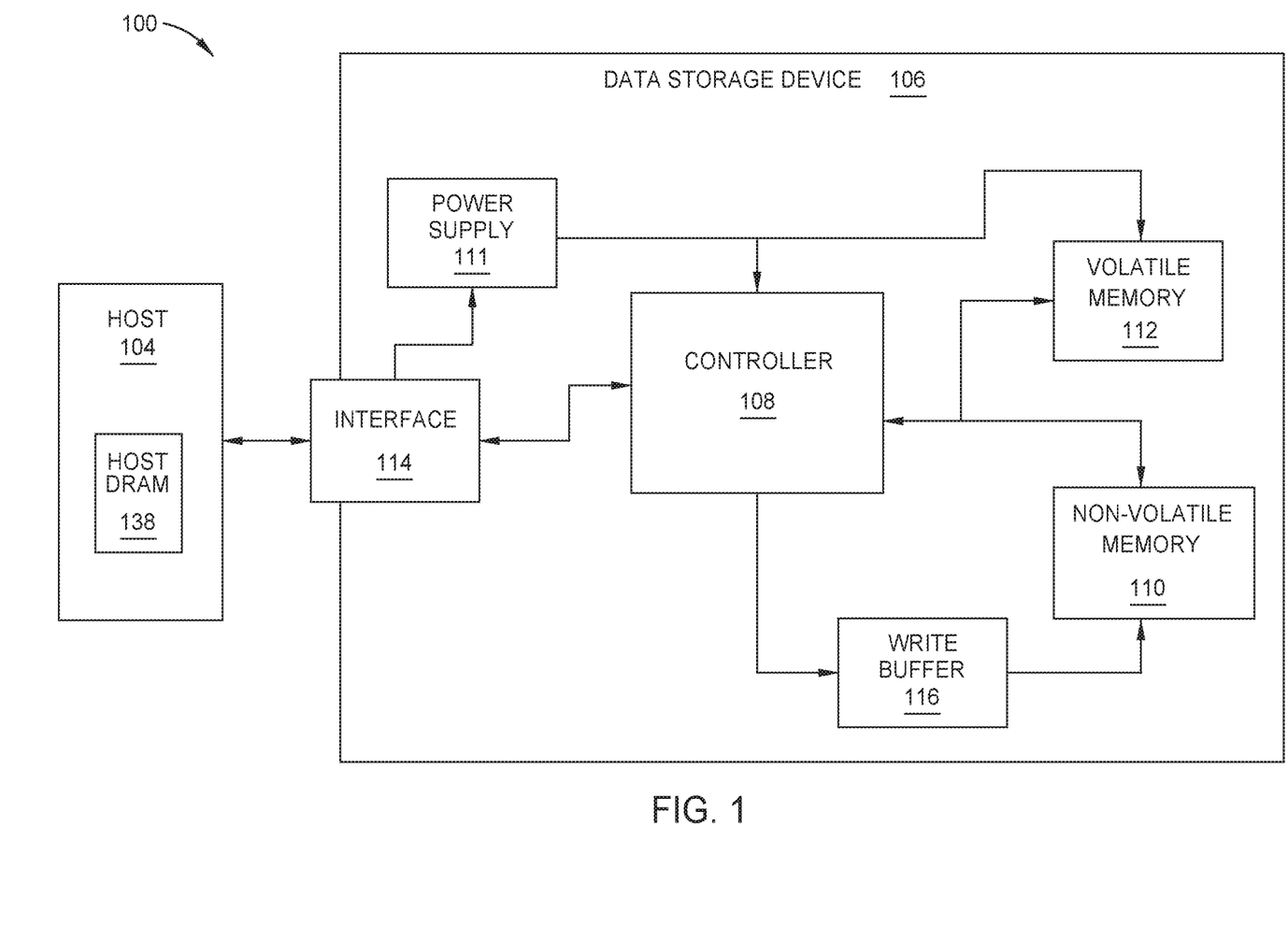
FIG. 1 is a schematic block diagram illustrating a storage system having a storage device that may function as a storage device for a host device, in accordance with one or more techniques of this disclosure.

FIG. 1 is a schematic block diagram illustrating a storage system 100 in which data storage device 106 may function as a storage device for a host device 104, in accordance with one or more techniques of this disclosure. For instance, the host device 104 may utilize NVM (non-volatile memory) 110 included in data storage device 106 to store and retrieve data. The host device 104 comprises a host DRAM 138 that comprises a read buffer 140. The read buffer 140 may be used to store read commands to be sent to the data storage device 106. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The storage system 100 includes the host device 104, which may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, internet of things (IOT) devices, and the like.

The data storage device 106 includes a controller 108, non-volatile memory 110 (NVM 110), a power supply 111, volatile memory 112, the interface 114, and a write buffer 116. In some examples, the data storage device 106 may include additional components not shown in FIG. 1 for sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., a hard disk drive (HDD) or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like provided that such protocols support zone management. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The data storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The data storage device 106 includes the power supply 111, which may provide power to one or more components of the data storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes the controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Figure 2A:
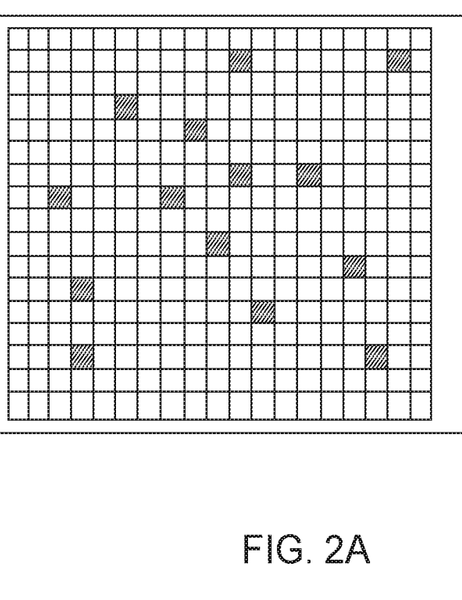
FIG. 2A is a schematic illustration of a traditional block storage device.
Figure 2B:
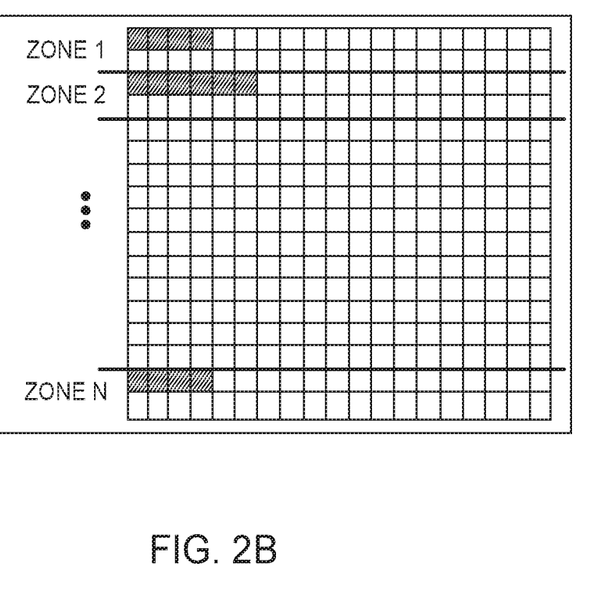
FIG. 2B is a schematic illustration of a zoned block storage device according to an embodiment.

FIGS. 2A and 2B are schematic illustrations of a block storage device, according to various embodiments. In one embodiment, the block storage device of FIG. 2A and FIG. 2B may be the NVM 110 of the data storage device 106 of FIG. 1. Furthermore, according to various embodiments, the block storage device of FIG. 2A and FIG. 2B may be a multi-level cell, such as SLC, MLC, TLC, QLC, or any other iteration of multi-level cell not listed. Each square of the block storage device of FIG. 2A and FIG. 2B represents a block available for data storage. A shaded square or block denotes that the block comprises data. The data may be user data, XOR or parity data, device metadata, or any other suitable data to be stored in the block storage device.

FIG. 2A is a schematic illustration of a (non zoned) block storage device. In a traditional block storage system, data is written sequentially to the storage device. However, the data may be inefficiently written to the drive resulting in a decrease in the working or effective capacity of the drive. In FIG. 2A, data has been written to blocks scattered throughout the block storage device. In order to overcome the inefficient writes to the drive, the block storage system may be over-provisioned so that the exposed capacity (i.e., capacity available for data) is similar to an efficiently written block storage device capacity. The increased capacity of the storage device and the inefficient writes to the storage device may require a large mapping table, such as a logical to physical (L2P) table, within the volatile memory, such as the volatile memory 112 of FIG. 1, to store the location of the data within the block storage device. The large mapping table may require a high capacity volatile memory 112, which may be cost inefficient or expensive.

FIG. 2B is a schematic illustration of a zoned block storage device. The zoned block storage device is partitioned into various zones, where the $N^{th}$ zone corresponds to the last zone in the storage device and the capacity of each zone is equal. In another embodiment, the zoned block storage device is partitioned into various streams, where the capacity of each stream is different. In the zoned block storage system, the system implements the ZNS protocol in hardware or firmware ZNS restricts data writes to be sequentially within a zone. In FIG. 2B, data has been written to the first four blocks sequentially of zone 1, to the first six blocks sequentially of zone 2, and to the first four blocks sequentially of zone N. Since ZNS restricts data writes to be sequentially within a zone, the capacity of each zone is optimized. Thus, the usable capacity of the storage device (i.e., available capacity for data) is increased instead of having to over-provision the storage device to maintain the same amount of usable capacity. The better utilization of the available capacity for data of the zoned block storage device may decrease the size of the mapping table or the L2P table stored in the volatile memory 112, which may decrease the volatile memory 112 size required.

Figure 3A:
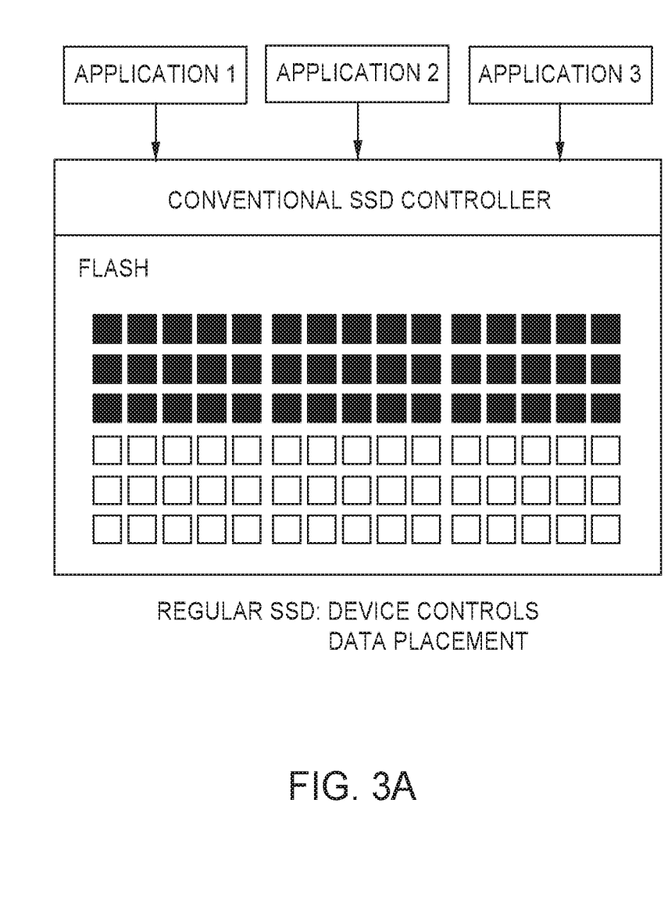
FIG. 3A is a schematic illustration of device control of a traditional SSD.
Figure 3B:
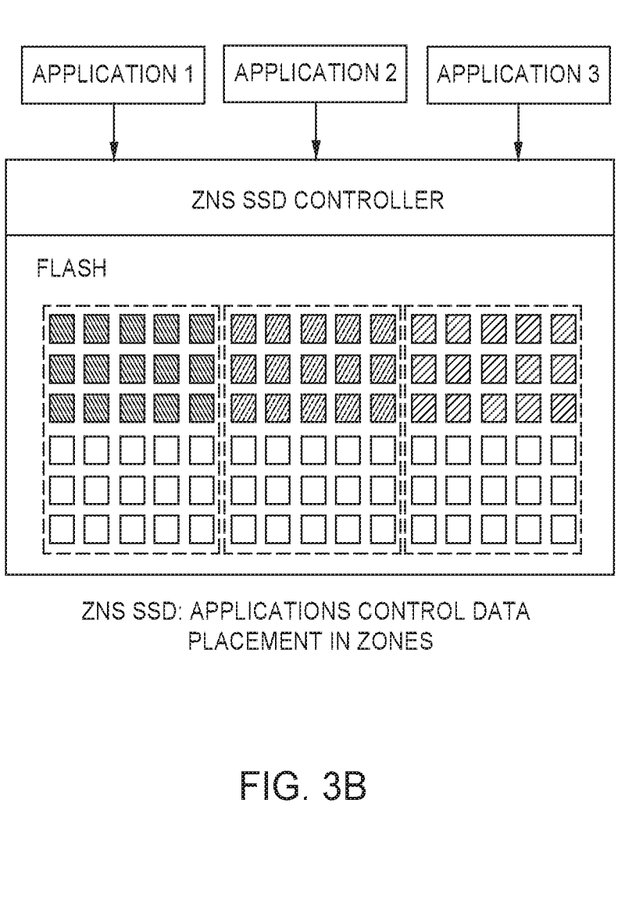
FIG. 3B is a schematic illustration of device control of a ZNS SSD according to an embodiment.

FIGS. 3A and 3B are schematic illustrations of device control of a SSD, according to various embodiments. Aspects of FIGS. 2A and 2B may be applicable to the understanding of FIGS. 3A and 3B. In one embodiment, the flash device of FIG. 3A and FIG. 3B may be the NVM 110 of the data storage device 106 of FIG. 1. Furthermore, according to various embodiments, the flash device of FIG. 3A and FIG. 3B may be a multi-level cell, such as SLC, MLC, TLC, QLC, or any other iteration of multi-level cell not listed. Each square of the block storage device of FIG. 3A and FIG. 3B represents a block available for data storage. A shaded square or block denotes that the block comprises data. The data may be user data, XOR or parity data, device metadata, or any other suitable data to be stored in the flash of the SSD.

FIG. 3A is a schematic illustration of device control of a traditional SSD. The SSD receives data from multiple applications, such as Application 1, Application 2, and Application 3. The data is stored in the flash of the SSD. In the SSD, the storage device controls the data placement. Data is written sequentially to the flash so that the data from each application may be written in the order that the data is received. Because the data from each application may be random throughout the sequential writes, endurance may be affected when different application interleave data FIG. 3B is a schematic illustration of device control of a ZNS SSD. Similar to FIG. 3A, the SSD receives data from multiple applications, such as Application 1, Application 2, and Application 3. The data is stored in the flash of the SSD. In the SSD, the applications or the host, such as the host device 104 of FIG. 1, controls the data placement in the zones. The flash of the SSD is partitioned into various equal capacity zones. The zones may be considered parallel units, in which the host device 104 may direct workloads or data to a specific parallel unit (i.e., the host has block access of the flash). For example, the data associated with Application 1 is located in a first zone, while the data associated with Application 2 is located in a second zone and the data associated with Application 3 is located in a third zone. Due to the zone provisioning, data associated with Application 1 is stored separately from the data associated with Application 2 potentially improving endurance.

Figure 4:
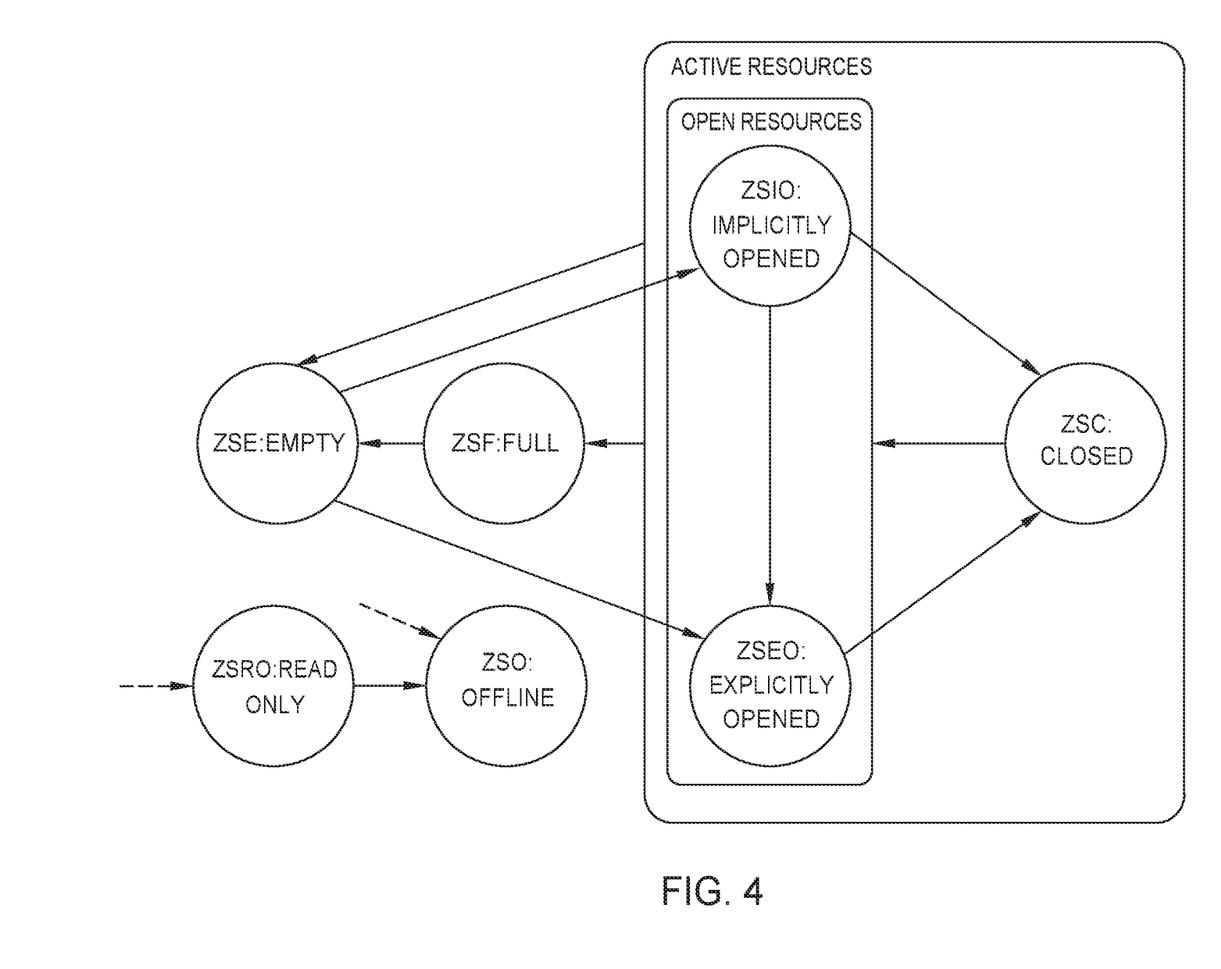
FIG. 4 is a schematic illustration of a state diagram for a ZNS SSD according to one embodiment.

FIG. 4 is a schematic illustration of a state diagram for a ZNS SSD according to one embodiment. In FIG. 4, the various zone states (ZS) are empty (i.e., ZSE:Empty), implicitly opened (i.e., ZSIO:Implicitly Opened), explicitly opened (i.e., ZSEO:Explicitly Opened), closed (i.e., ZSC:Closed), full (i.e., ZSF:Full), read only (i.e., ZSRO:Read Only), and offline (i.e., ZSO:Offline). A generic flow path for a zone may be from an empty state to an open state, which may be either implicitly opened or explicitly opened. From an open state, the zone may be at capacity so that the ZNS is full. After the full state, the zone contents may be erased, which resets the ZNS to empty.

The initial state for each zone after a controller, such as the controller 108 of FIG. 1, power-on or reset event is determined by the zone characteristics of each zone. For example, the zone state, ZSE:Empty, is denoted by a valid write pointer (WP) that points to the lowest LBA (i.e., zone start LBA) in the zone. The zone state, ZSC:Closed, is denote by a WP that does not point to the lowest LBA in the zone. The zone state, ZSF:Full, is the initial state if the most recent zone condition was full. The zone state, ZSRO:Read Only, is the initial state if the most recent zone condition was read only. The zone state, ZSO:Offline, is the initial state if the most recent zone condition was offline.

The zones may have any total capacity or total size, such as 256 MiB or 512 MiB. However, a small portion of each zone may be inaccessible to write data to, but may still be read, such as a portion of each zone storing the XOR data, metadata, and one or more excluded erase blocks. For example, if the total capacity of a zone is 512 MiB, the zone capacity (ZCAP) may be 470 MiB, which is the capacity available to write data to, while 42 MiB are unavailable to write data. The ZCAP of a zone is equal to or less than the total zone storage capacity or total zone storage size. The storage device, such as the data storage device 106 of FIG. 1, the block storage device of FIG. 2B, or the SSD of FIG. 3B, may determine the ZCAP of each zone upon zone reset. For example, the controller, such as the controller 108 of FIG. 1, may determine the ZCAP of each zone. The storage device may determine the ZCAP of a zone when the zone is reset.

When a zone is empty (i.e., ZSE:Empty), the zone is free of data (i.e., none of the erase blocks in the zone are currently storing data) and the write pointer (WP) is at the zone start LBA (ZSLBA) (i.e., WP=0). The ZSLBA refers to the start of a zone (i.e., the first NAND location of a zone). The write pointer signifies the location of the data write in a zone of the storage device. An empty zone switches to an open and active zone once a write is scheduled to the zone or if the zone open command is issued by the host (i.e., ZSIO:Implicitly Opened or ZSEO:Explicitly Opened). Zone management (ZM) commands can be used to move a zone between zone open and zone closed states, which are both active states. If a zone is active, the zone comprises open blocks that may be written to, and the host may be provided a description of recommended time in the active state. The controller 108 comprises the ZM (not shown). Zone metadata may be stored in the ZM and/or the controller 108.

The term "written to" includes programming user data on 0 or more NAND locations in an erase block and/or partially filled NAND locations in an erase block when user data has not filled all of the available NAND locations. A NAND location may be a flash location, as referred to in FIGS. 2A and 2B and in FIGS. 3A and 3B. The term "written to" may further include moving a zone to full (i.e., ZSF:Full) due to internal drive handling needs (open block data retention concerns because the bits in error accumulate more quickly on open erase blocks), the data storage device 106 closing or filling a zone due to resource constraints, like too many open zones to track or discovered defect state, among others, or a host device, such as the host device 104 of FIG. 1, closing the zone for concerns such as there being no more data to send the drive, computer shutdown, error handling on the host, limited host resources for tracking, among others.

The active zones may be either open (i.e., ZSIO:Implicitly Opened or ZSEO:Explicitly Opened) or closed (i.e., ZSC:Closed). An open zone is an empty or partially full zone that is ready to be written to and has resources currently allocated. The data received from the host device with a write command or zone append command may be programmed to an open erase block that is not currently filled with prior data. A closed zone is an empty or partially full zone that is not currently receiving writes from the host in an ongoing basis. The movement of a zone from an open state to a closed state allows the controller 108 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available blocks to write data to (i.e., WP=zone capacity (ZCAP)). In a full zone, the write pointer points to the end of the writeable capacity of the zone. Read commands of data stored in full zones may still be executed.

The ZM may reset a full zone (i.e., ZSF:Full), scheduling an erasure of the data stored in the zone such that the zone switches back to an empty zone (i.e., ZSE:Empty). When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. Upon resetting a zone, the data storage device 106 may determine a new ZCAP of the reset zone and update the Writeable ZCAP attribute in the zone metadata. An offline zone is a zone that is unavailable to write data to. An offline zone may be in the full state, the empty state, or in a partially full state without being active.

Since resetting a zone clears or schedules an erasure of all data stored in the zone, the need for garbage collection of individual erase blocks is eliminated, improving the overall garbage collection process of the data storage device 106. The data storage device 106 may mark one or more erase blocks for erasure. When a new zone is going to be formed and the data storage device 106 anticipates a ZM open, the one or more erase blocks marked for erasure may then be erased. The data storage device 106 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer for the zone may be selected, enabling the zone to be tolerant to receive commands out of sequential order. The write pointer may optionally be turned off such that a command may be written to whatever starting LBA is indicated for the command.

The controller 108 provides a $T_{ZoneActiveLimit}$ (ZAL) value per zone. The ZAL may also be applicable to blocks and/or streams, in various embodiments. Each zone is assigned a ZAL value, which the ZAL value represents the time that the open zone may remain open. In standard storage devices, the ZAL value is fixed throughout the time that the relevant zone is in usage by the host device 104 (i.e., the storage device receives write or read commands from the host for the relevant zone). The ZAL value is shared by each zone of the namespace (i.e., a global ZAL value). The time that ZAL value corresponds to is a maximum value of time before an unacceptable amount of bit errors have accumulated in a zone. The host device 104 or the data storage device 106 may close the zone prior to reaching the ZAL value to avoid the unacceptable amount of bit errors accumulated.

If the zone active limit is a non-zero value, the controller may transition a zone in either ZSIO:Implicitly Opened, ZSEO:Explicitly Opened or ZSC:Closed state to the ZSF: Full state. When a zone is transitioned to the ZSIO:Implicitly Opened state or ZSEO:Explicitly Opened state, an internal timer in seconds starts so that the host device 104 or the data storage device 106 recognizes when the ZAL value is exceeded. If the ZAL value or time limit is exceeded, the controller 108 may either warn the host device 104 that the zone requires finishing (i.e., the zone needs to be at capacity) or transition the zone to the ZSF:Full state. When the host device 104 is warned that the zone requires finishing, the zone finish recommended field is set to 1 and the zone information changed event is reported to the host device 104. When the zone is transitioned to the ZSF:Full state, the zone finished by controller field is set to 1 and the zone information changed event is reported to the host device 104. Because the ZAL value is a global parameter for each zone of the storage device, a zone may be closed prematurely allowing for less than optimal storage drive operation or be closed late allowing for an unacceptable amount of bit errors to accumulate, which may result in a decreased integrity of the data storage device. The unacceptable accumulation of bit errors may also result in a decreased performance of the data storage device. The global ZAL parameter is a static parameter and may be based on a worst-case estimate of the conditions that a host may face.

Figure 5:
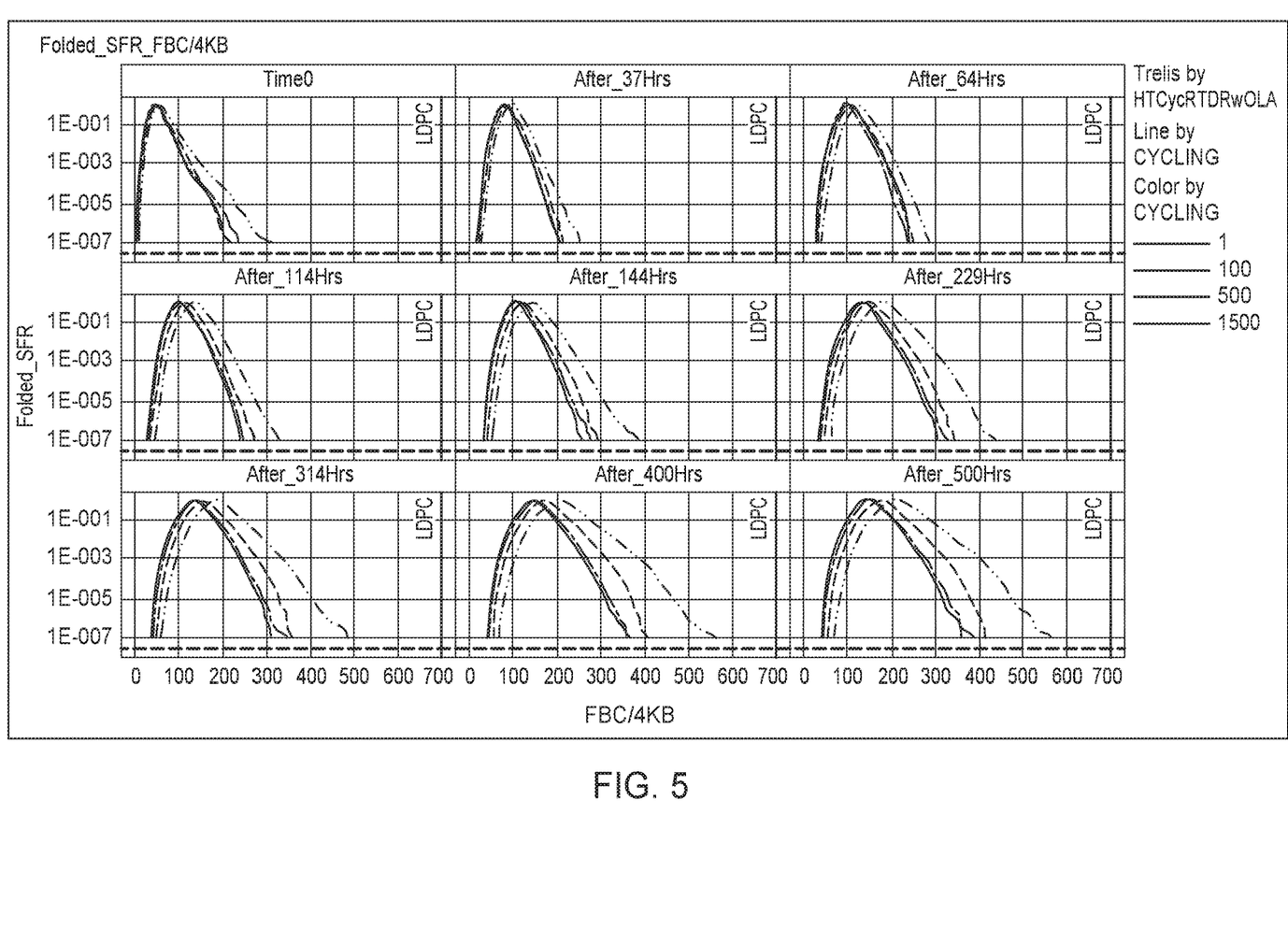
FIG. 5 is a schematic illustration of a failed or flipped bit count (FBC) distribution per cycling condition at various points in time in the life of a ZNS SSD.

FIG. 5 is a schematic illustration of a failed or flipped bit count (FBC) distribution per cycling condition at various points in time in the life of a ZNS SSD. The bit error rate (BER) estimates the amount of failed or flipped bits (i.e., FBC) in a memory device or of each individual memory unit within the memory device. The BER may also be used to estimate the FBC of a zone within a memory unit. The term "zone" may also refer to any grouping of a memory location or NAND location such as, but not limited to, a block, a stream, a die, and so-forth.

In FIG. 5, nine different embodiments of ZAL values are illustrated. Each embodiment of FIG. 5 is an example of a statistical distribution of ZAL measurements at different cycling levels and different retention-periods (RT-level). The FBC is on the x-axis and the probability to get the FBC is on the y-axis. Each illustration of the individual ZAL value comprises curves corresponding to various cycling values. The cycling values may refer to a write/erase cycle, where each time a write or an erase occurs, the flash memory cell wears and may lose the ability to store data. For example, the cycling values shown are 1 cycle, 100 cycles, 500 cycles, and 1500 cycles. The cycling values listed are not intended to be limiting, but to provide various examples of possible embodiments. As the cycling value increases, the FBC increases (i.e., the curve illustrates a less than optimal scenario) for each ZAL value. The FBC also increases for increasing ZAL values.

The global ZAL value may be set by choosing a value that corresponds to the current cycling condition (e.g., a cycling value of 1 cycle, a cycling value of 100 cycles, and so-forth) and the open zone time of a memory cell or a memory location. After selecting the current cycling condition, the right-most FBC value of the relevant cycling curve is selected. For example, for a cycling value of 1500 of the "After_314Hrs" graph, the right-most FBC value is about 490 FBC/4 KiB. The right-most value is a predefined FBC value that represents the end-of-life conditions of a memory unit or a memory cell. The ZAL value is selected based on a maximum allowable FBC value for a given cycling value. For example, if the cycling value is 1500 cycles and the maximum FBC value is 500 KiB, the ZAL value selected about 400 hours, as shown in the "After_400Hrs" graph. After the global ZAL value is exceeded, the host, such as the host device 104 of FIG. 1, is notified by the controller of the storage device, such as the controller 108 of the data storage device 106 of FIG. 1.

Figure 6:
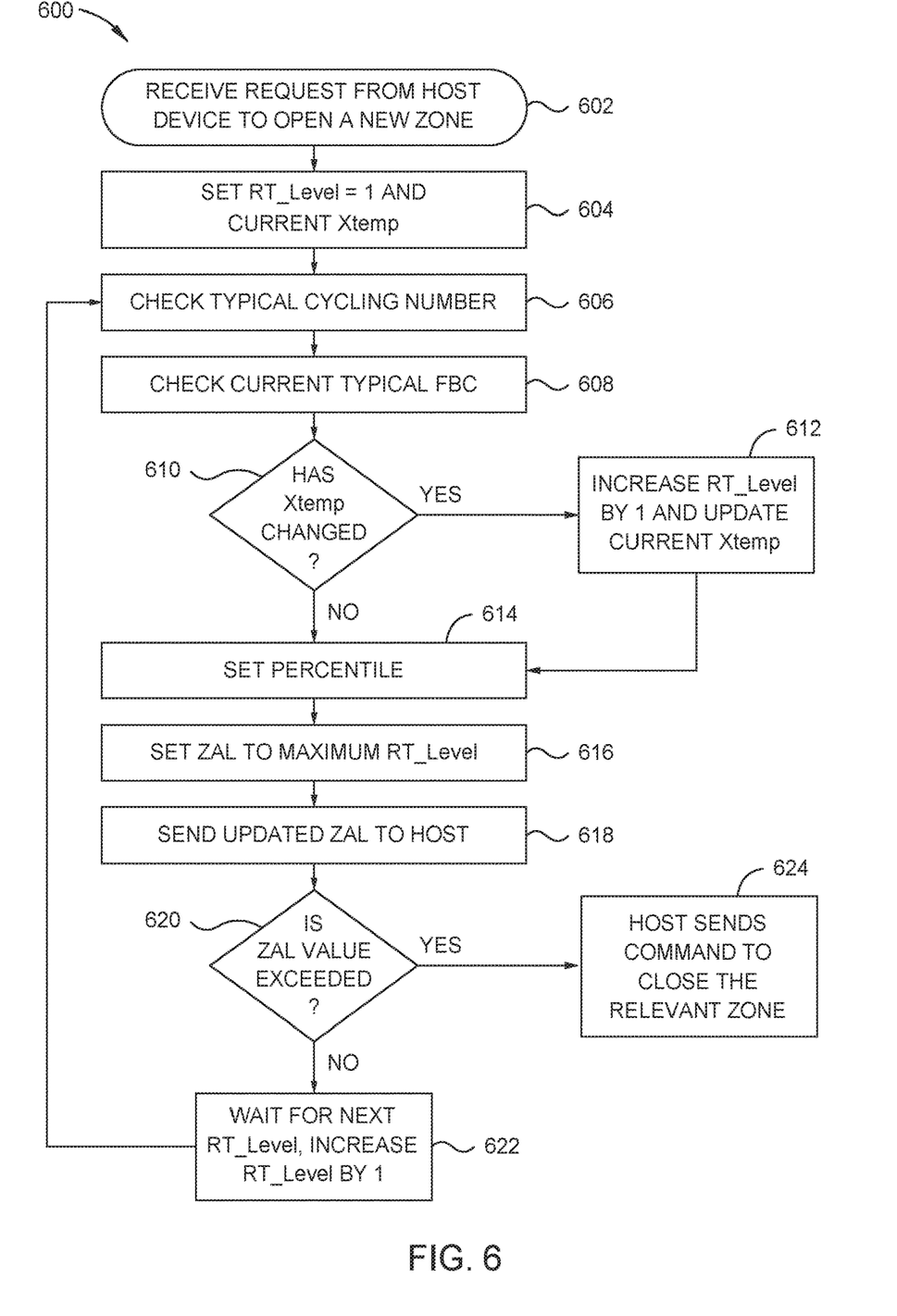
FIG. 6 is a flowchart illustrating a dynamic ZNS open block valid time calculation according to one embodiment.

FIG. 6 is a flowchart illustrating a dynamic ZNS open block valid time calculation according to one embodiment. Aspects of FIG. 5 will be used in accordance with FIG. 6. The host, such as the host device 104 of FIG. 1, has block access, so that the host may issue commands to open blocks or any like groupings of NAND locations, such as a stream, a zone, and so-forth. A memory unit is comprised of memory cells and each memory cell comprises a plurality of NAND locations. A memory unit may be any multi-level cell, such as SLC, MLC, TLC, QLC, or any other iteration of multi-level cell not listed. The host device 104 is notified of changes to the ZAL value due to changes of block conditions or block to block variations. When the host device 104 is notified of changes to the ZAL value of a zone from the global ZAL value, the zone finish recommendation (ZFR) may be amended. Furthermore, a log page that keeps track of the zone-specific ZAL value for each zone, so that the host device 104 determines when each zone should be closed. When a zone is closed, the zone is either at capacity from user data or filled with pad data to achieve zone capacity.

At block 602, the storage device, such as the data storage device 106 of FIG. 1, receives a request from the host device 104 to open a new zone. When the new zone is opened, the controller, such as the controller 108 of FIG. 1, logic sets the RT_Level equal to 1 and records the current temperature (i.e., Xtemp). The RT_Level may refer to the various embodiments described in FIG. 5. When the RT_Level equals 1, the relevant graph of FIG. 5 is the "Time0" graph.

The controller 108 comprises a temperature sensor (not shown) to monitor the temperature of each memory unit. The temperature sensor may have the capability to record the temperature of specific memory locations of a memory unit, such as a block or a zone. The Xtemp refers to the temperature of a relevant zone, or the like, corresponding to the host request to open a new zone. Changes to the temperature of a zone or a memory location may affect neighboring zones or memory locations. Furthermore, changes to the temperature of a zone or a memory location may increase the FBC and may utilize another set of distribution tables similar to the embodiments of FIG. 5.

At block 606, the controller 108 checks the typical cycling number for the zone of the memory unit. At block 608, the controller 108 checks the current typical FBC, as illustrated in FIG. 5. After checking the current typical FBC at block 608, the controller determines if the Xtemp has changed at block 610. If the Xtemp has changed, the RT_Level is increased by 1 and the Xtemp is updated to the current temperature at block 612.

If the Xtemp has not changed at block 610 or after increasing the RT_level and recording the updated Xtemp at block 612, the controller 108 sets the percentile at block 614. The percentile is set based on the relevant statistical FBC distribution. The controller 108 then sets the ZAL to the maximum RT_Level at block 616, which is a value that fulfills the FBC requirement at end-of-life. The updated ZAL value is sent to the host device 104 at block 618.

After the ZAL value is sent to the host device 104, the host device 104 determines if the ZAL value has been exceeded at block 620. The host device 104 is able to determine if the ZAL value has been exceeded since it has NAND block access. If the ZAL value has been exceeded at block 620, the host sends a command to close the relevant zone at block 624 that has exceeded the ZAL value. However, if the ZAL value has not been exceeded at block 620, host device 104 waits to receive another RT_Level and the current RT_Level at the controller 108 increases by 1 at block 622. After increasing the current RT_Level by 1 at block 622, the controller checks the typical cycling number at 606. The process continues and repeats from block 606 to block 622 until the ZAL value for a zone has been exceeded at block 620 and the relevant zone is closed at block 624.

By dynamically adjusting the ZAL for a ZNS device, a more flexible operation, optimized for performance and endurance is achieved. A dynamic ZAL value will allow for better utilization of ZNS products by host devices. Host devices will benefit from larger ZAL parameters since the ZAL parameters will be based upon normal scenarios and the current health of the blocks rather than on the worst-case scenarios.

In one embodiment, a data storage device comprises: a memory device; and a controller supporting at least one zoned namespace (ZNS) coupled to the memory device, wherein the controller is configured to: receive a request from a host device to open a new zone; deliver an initial zone active limit (ZAL) value for the ZNS to the host device; change the initial ZAL value for the ZNS to a new ZAL value for the ZNS; and communicate the new ZAL value for the ZNS to the host device. The controller is further configured to calculate the new ZAL value for the ZNS. The new ZAL value is based upon a change in a temperature of the data storage device. The new ZAL value is based upon a change in flipped bit count for the data storage device. The initial ZAL value is based on a cycling level of blocks that are in the open zone. The cycling level of the blocks remains the same while the zone is open. The new ZAL value is less than the initial ZAL value.

In another embodiment, a data storage device comprises: a memory device; and a controller coupled to the memory device, wherein the controller is configured to: provide an initial zone active limit (ZAL) value for a zoned namespace (ZNS) to a host device; analyze a block of the ZNS; determine conditions in which the block operates; calculate a new ZAL value for the ZNS; and communicate the new ZAL value for the ZNS to the host device.

Communicating the new ZAL value comprises directing the host device to a zone information log page. The controller is further configured to update parameters of the zone information log page. The controller is further configured to change a zone finish recommendation (ZFR) flag. The controller is further configured to increase a retention level. The controller increases the retention level after communicating the new ZAL value for the ZNS to the host device. The controller is further configured to measure a temperature of the data storage device.

In another embodiment, a data storage device comprises: a memory device; a controller coupled to the memory device; and means to dynamically change an initial zone active limit (ZAL) value to a new ZAL value while a zoned namespace (ZNS) is open. The data storage device further comprises means to update a host device based with the new ZAL value. The data storage device further comprises means to check for a temperature change of the data storage device. The data storage device further comprises means to check a flipped or failed bit count (FBC). The data storage device further comprises means to compare the checked FBC to an expected FBC. The data storage device further comprises means to choose a maximal RT_Level value that fulfills an FBC requirement at end-of-life of the data storage device.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller supporting at least one zoned namespace (ZNS) coupled to the memory device, wherein the controller is configured to:
receive a request from a host device to open a new zone;
deliver an initial zone active limit (ZAL) value for the ZNS to the host device, wherein a ZAL value corresponds to a maximum time that an open zone can be open for, wherein the open zone is closed upon reaching the maximum time, wherein the ZAL value corresponds to a current cycling condition of the open zone and a time that the open zone has been open for, and wherein the current cycling condition corresponds to a number of write/erase cycles of the open zone;
change, based on the current cycling condition, the initial ZAL value for the ZNS to a new ZAL value for the ZNS; and
communicate the new ZAL value for the ZNS to the host device.

2. The data storage device of claim 1, wherein the controller is further configured to calculate the new ZAL value for the ZNS.

3. The data storage device of claim 2, wherein the new ZAL value is based upon a change in a temperature of the data storage device.

4. The data storage device of claim 2, wherein the new ZAL value is based upon a change in flipped bit count for the data storage device.

5. The data storage device of claim 1, wherein the initial ZAL value is based on a cycling level of blocks that are in the open zone.

6. The data storage device of claim 5, wherein the cycling level of the blocks remains the same while the zone is open.

7. The data storage device of claim 1, wherein the new ZAL value is less than the initial ZAL value.

8. A data storage device, comprising:
a memory device; and
a controller coupled to the memory device, wherein the controller is configured to:
provide an initial zone active limit (ZAL) value for a zoned namespace (ZNS) to a host device, wherein a ZAL value corresponds to a maximum time that an open zone can be open for, wherein the open zone is closed upon reaching the maximum time, wherein the ZAL value corresponds to a current cycling condition of the open zone and a time that the open zone has been open for, and wherein the current cycling condition corresponds to a number of write/erase cycles of the open zone;
analyze a block of the ZNS;
determine conditions in which the block operates;
calculate, based on the current cycling condition, a new ZAL value for the ZNS; and
communicate the new ZAL value for the ZNS to the host device.

9. The data storage device of claim 8, wherein communicating the new ZAL value comprises directing the host device to a zone information log page.

10. The data storage device of claim 9, wherein the controller is further configured to update parameters of the zone information log page.

11. The data storage device of claim 8, wherein the controller is further configured to change a zone finish recommendation (ZFR) flag.

12. The data storage device of claim 8, wherein the controller is further configured to increase a retention level.

13. The data storage device of claim 12, wherein the controller increases the retention level after communicating the new ZAL value for the ZNS to the host device.

14. The data storage device of claim 8, wherein the controller is further configured to measure a temperature of the data storage device.

15. A data storage device, comprising:
a memory device;
a controller coupled to the memory device; and
means to dynamically change, based on a current cycling condition, an initial zone active limit (ZAL) value to a new ZAL value while a zoned namespace (ZNS) is open, wherein a ZAL value corresponds to a maximum time that an open zone can be open for, wherein the open zone is closed upon reaching the maximum time, wherein the ZAL value corresponds to the current cycling condition of the open zone and a time that the open zone has been open for, and wherein the current cycling condition corresponds to a number of write/erase cycles of the open zone.

16. The data storage device of claim 15, further comprising means to update a host device based with the new ZAL value.

17. The data storage device of claim 15, further comprising means to check for a temperature change of the data storage device.

18. The data storage device of claim 15, further comprising means to check a flipped or failed bit count (FBC).

19. The data storage device of claim 18, further comprising means to compare the checked FBC to an expected FBC.

20. The data storage device of claim 19, further comprising means to choose a maximal RT_Level value that fulfills an FBC requirement at end-of-life of the data storage device.

* * * * *